United States Patent [19]

Long

[11] Patent Number: 5,445,352

[45] Date of Patent: Aug. 29, 1995

[54] PORTABLE TELESCOPING STAND FOR TRUCK CAMPER TOPS

[76] Inventor: Jesse L. Long, Rte. #2, Box 1390, Elizabethton, Tenn. 37643

[21] Appl. No.: 179,315

[22] Filed: Jan. 10, 1994

[51] Int. Cl.⁶ ............................................. F16M 13/00
[52] U.S. Cl. ............................... 248/354.5; 248/188.5; 248/188.7
[58] Field of Search ............. 248/354.6, 354.5, 354.1, 248/352, 351, 188.7, 188.5; 254/11

[56] References Cited

U.S. PATENT DOCUMENTS

| | | | |
|---|---|---|---|
| 2,535,141 | 12/1950 | Kenney et al. | 248/354.5 X |
| 3,313,505 | 4/1967 | Petrie | 248/354.5 X |
| 4,690,361 | 9/1987 | Lundman | 248/354.5 X |
| 4,937,989 | 7/1990 | Miyares et al. | 248/351 X |
| 5,056,750 | 10/1991 | Ellithorpe | 248/344.3 |
| 5,203,533 | 4/1993 | Karen | 248/352 X |

FOREIGN PATENT DOCUMENTS 0216205  7/1961  Austria ............................ 248/354.6

Primary Examiner—Ramon O. Ramirez

[57] ABSTRACT

A new and improved portable telescoping stand for truck camper tops for facilitating easy one-person removal of a camper top from a pickup truck by supporting, in combination with other like stands, the camper top in an elevated position relative to the truck bed after the top has been raised free of the truck bed by jacking whereby the truck may be driven out from under the elevated camper top, the portable telescoping stand for truck camper tops comprising a variable-height stand having a broad base whereby the stand is stably supported in an upright position, the stand also having a bifurcated yoke fixedly connected to the top wherein a plank, a beam, or the like may extend to another similar stand for supporting the camper top, the stand further having a locking mechanism whereby the height of the stand may be fixed in place.

3 Claims, 4 Drawing Sheets

PORTABLE TELESCOPING STAND FOR TRUCK CAMPER TOPS

BACKGROUND OF THE INVENTION

1. Field of the Invention

The present invention relates to jack stands and more particularly pertains to portable telescoping stands for truck camper tops which may be used for facilitating easy one-person removal of a camper top from a pickup truck by supporting, in combination with other like stands, the camper top in an elevated position relative to the truck bed after the top has been raised free of the truck bed by jacking whereby the truck may be driven out from under the elevated camper top.

2. Description of the Prior Art

The use of jack stands is known in the prior art. More specifically, jack stands heretofore devised and utilized for the purpose of removal of a camper top from a pickup truck are known to consist basically of familiar, expected and obvious structural configurations, notwithstanding the myriad of designs encompassed by the crowded prior art which have been developed for the fulfillment of countless objectives and requirements.

The present invention is directed to improving devices for removal of a camper top from a pickup truck in a manner which is safe, secure, economical and aesthetically pleasing.

For example, U.S. Pat. No. 5,110,089 to Slay discloses an extendible jack stand apparatus including first, second, and third normally vertical frames arranged in telescoping relationship, and containing a locking mechanism for automatically locking the first and second frames together while the third frame is being raised, locking the second and third frames together when the third frames is fully raised, and unlocking the first and second frames to allow extension of the second frame; conversely, the locking mechanism is automatically reversible as the jack is lowered, unlocking the second and third frames and relocking the first and second frames upon the second frame being fully retracted into the first, allowing the third frame to be fully retracted into the first and second frames. The invention disclosed is overly complicated and has a relatively high cost of manufacture.

U.S. Pat. No. 3,989,276 to Hamerl describes a jack stand having a mounting plate enabling the stand to be mounted to any standard hitch bar. A front leg is pivoted by the upper end thereof to the front of the plate and extends downwardly and rearwardly thereof, terminating in a curved ground engaging skid. Over-center linkage is pivoted between the skid and the mounting plate extending upwardly and rearwardly towards said mounting plate when in the extended position; a level action makes or breaks the over-center linkage thereby extending or retracting the jack stand.

U.S. Pat. No. 3,920,212 to Westwood discloses a jack stand for supporting hydraulic, pneumatic, mechanical and electromechanical jacks such that the jacks will have greatly increased stability during the handling of heavy loads using the jacks; the stand includes a central broad platform interconnected with broad feet and a horseshoe collar spaced above the broad central platform and interconnected to the platform and to the spaced feet; means can be provided for closing the opening formed by the horseshoe collar to further support a jack positioned on the stand and within the collar, should this be deemed desirable.

Neither of the inventions disclosed above show a way to quickly and easily support a truck camper top.

The prior art also discloses a jack stand as shown in U.S. Pat. No. 3,802,658 to Binding comprising a hollow column supported in an upright perpendicular position by a base plate at its lower end with a post telescopically supported within its upper end for extension relative thereto and a saddle at the upper end of the post; a pin mounted in inclined slots in the column by engagement with one of a plurality of notches on the post holds the latter at a predetermined position of extension; the pin is movable in the slots from an operative position supporting the post to an inoperative position to allow the post to be moved upwardly or downwardly relative to the column and back to an operative position in engagement with a different notch; there is a secondary support in the form of a plate at the top of the column movable into engagement with another notch and there is linkage interconnecting the pin and plate such that movement of the pin into and out of operative position is accompanied by movement if the plate into and out of operative position.

U.S. Pat. No. 4,021,012 to Miller shows a telescoping jack stand made of stamped metal parts with a pair of angularly extending legs which are pivotally mounted with respect to each other; the legs define an aperture between the legs with inwardly extending integral teeth; a central column member includes matching teeth and corresponding in shape and dimension with the aperture between the two legs; the central column includes recesses corresponding to the integral teeth of the legs; the legs are pivoted with respect to each other so that upon engagement of the teeth with the recesses in the column, additional load tends to pivot the teeth into greater engagement with the column and provide improved stability.

Both of the inventions described have base structures too small to provide good stability when used to support a truck camper top. Furthermore, the telescoping jack stand having pivotally mounted legs could subject a user to injury if one or both of the legs were inadvertently kicked inward during operation thereby causing the jack to unexpectedly retract.

In this respect, the portable telescoping stand for truck camper tops according to the present invention substantially departs from the conventional concepts and designs of the prior art, and in so doing provides an apparatus primarily developed for the purpose of facilitating easy one-person removal of a camper top from a pickup truck by supporting, in combination with other like stands, the camper top in an elevated position relative to the truck bed after the top has been raised free of the truck bed by jacking whereby the truck may be driven out from under the elevated camper top.

Therefore, it can be appreciated that there exists a continuing need for new and improved portable telescoping stands for truck camper tops which can be used for facilitating easy one-person removal of a camper top from a pickup truck by supporting, in combination with other like stands, the camper top in an elevated position relative to the truck bed after the top has been raised free of the truck bed by jacking whereby the truck may be driven out from under the elevated camper top. In this regard, the present invention substantially fulfills this need.

As illustrated by the background art, efforts are continuously being made in an attempt to develop devices for facilitating removal of a camper top from a pickup truck. No prior effort, however, provides the benefits attendant with the present invention. Additionally, the prior patents and commercial techniques do not suggest the present inventive combination of component elements arranged and configured as disclosed and claimed herein.

The present invention achieves its intended purposes, objects, and advantages through a new, useful and unobvious combination of method steps and component elements, with the use of a minimum number of functioning parts, at a reasonable cost to manufacture, and by employing only readily available materials.

SUMMARY OF THE INVENTION

In view of the foregoing disadvantages inherent in the known types of jack stands now present in the prior art, the present invention provides an improved portable telescoping stand construction wherein the same can be utilized for facilitating easy one-person removal of a camper top from a pickup truck by supporting, in combination with other like stands, the camper top in an elevated position relative to the truck bed after the top has been raised free of the truck bed by jacking whereby the truck may be driven out from under the elevated camper top. As such, the general purpose of the present invention, which will be described subsequently in greater detail, is to provide a new and improved portable telescoping stand for truck camper tops apparatus and method which has all the advantages of the prior art jack stands and none of the disadvantages.

The invention is defined by the appended claims with the specific embodiment shown in the attached drawings. For the purpose of summarizing the invention, the invention may be incorporated into a new and improved portable telescoping stand for truck camper tops for facilitating easy one-person removal of a camper top from a pickup truck. Removal is facilitated by supporting, in combination with other like stands, the camper top in an elevated position relative to the truck bed after the top has been raised free of the truck bed by jacking. The truck may then be driven out from under the elevated camper top. The portable telescoping stand for truck camper tops comprises a lower support structure having a first hollow column supported in an upright position by a base. The base has a plurality of spaced apart support legs fixedly radially connected at one end to the lower end of the first column, the support legs extending from the first column at right angles to the column. The legs are equally spaced around the column to provide stability for the column whereby tipping caused by slightly off-center loads is precluded. The first column also has a plurality of spaced apart lateral holes therethrough, the lateral holes lying on parallel axes to each other at right angles to and intersecting the axis of the hollow first column. The stand also includes an upper support structure having a hollow second column telescopically operationally disposed over the first column whereby the overall height of the stand may be increased or decreased. The second column has a bifurcated yoke with upstanding ears fixedly connected to the upper end. The second column also has a plurality of spaced apart lateral holes therethrough, the lateral holes having essentially the same diameter as the holes of the first column. The lateral holes lie on parallel axes to each other, at right angles to and intersecting the axis of the hollow second column so when the upper support structure is telescopically longitudinally moved with respect to the lower support structure holes in the second column may be made to line up with holes in the first column. The stand further includes pin means whereby the overall height of the stand may be locked at any one of a plurality of discrete steps by inserting the pin through coincident holes of the first and second columns nearest a desired stand height. The pin means comprises a rod formed from shear-resistant material such as steel. The rod is substantially longer than the diameter of the second column. The rod also has a diameter essentially the same as the diameter of the holes of the first and second columns. The rod additionally has handle means whereby the rod may be easily grasped by a user. The rod extends through a hole in the second column and also extends through a hole in the first column.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In as much as the foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent methods and structures do not depart from the spirit and scope of the invention as set forth in the appended claims.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide a new and improved portable telescoping stand for truck camper tops for facilitating easy one-person removal of a camper top from a pickup truck by supporting, in combination with other like stands, the camper top in an elevated position relative to the truck bed after the top has been raised free of the truck bed by jacking whereby the truck may be driven out from under the elevated camper top, the portable telescoping stand for truck camper tops comprising: a variable-height stand having a broad base whereby the stand is stably supported in an upright position, the stand also having a bifurcated yoke fixedly connected to the top wherein a plank, a beam, or the like may extend to another similar stand for supporting the camper top, the stand further having a locking mechanism whereby the height of the stand may be fixed in place.

It is therefore an additional object of the present invention to provide a new and improved portable telescoping stand for truck camper tops which has all the advantages of the prior art jack stands and none of the disadvantages.

It is another object of the present invention to provide a new and improved portable telescoping stand for truck camper tops which may be easily and efficiently manufactured and marketed.

It is a further object of the present invention to provide a new and improved portable telescoping stand for truck camper tops which is of a durable and reliable construction.

An even further object of the present invention is to provide a new and improved portable telescoping stand for truck camper tops which is susceptible of a low cost of manufacture with regard to both materials and labor, and which accordingly is then susceptible of low prices of sale to the consuming public, thereby making such portable telescoping stands for truck camper tops economically available to the buying public.

Still yet another object of the present invention is to provide a new and improved portable telescoping stand for truck camper tops which provides in the apparatuses and methods of the prior art some of the advantages thereof, while simultaneously overcoming some of the disadvantages normally associated therewith.

Still yet another object of the present invention is to provide a new and improved portable telescoping stand for truck camper tops that is compact and easy to store when not in use.

Yet another object of the present invention is to provide a new and improved portable telescoping stand for truck camper tops which may be universally applied to facilitate removal of all sizes and types of truck camper tops.

Even still another object of the present invention is to provide a new and improved portable telescoping stand for truck camper tops which also provides an alarm means for notifying the owner of unauthorized removal of the camper top from the stand.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention. The foregoing has outlined some of the more pertinent objects of this invention. These objects should be construed to be merely illustrative of some of the more prominent features and applications of the present invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 3:
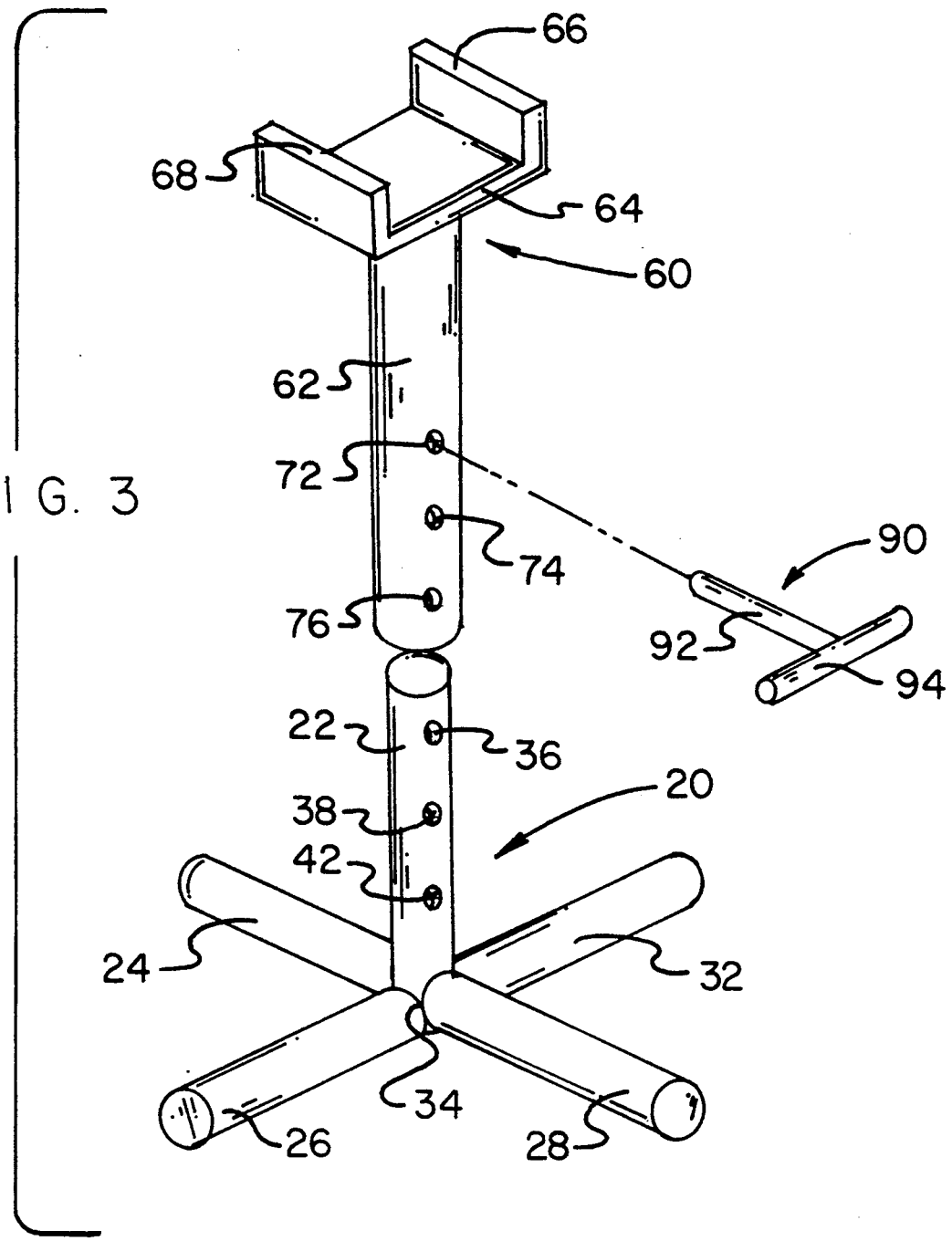
FIG. 3 is an exploded perspective view of the invention of FIG. 2 showing its component parts.

With reference now to the drawings, and in particular to FIG. 3 thereof, a new and improved portable telescoping stand for truck camper tops embodying the principles and concepts of the present invention and generally designated by the reference numeral 10 will be described.

From an overview standpoint, the portable telescoping stand for truck camper tops is adapted for use to facilitate easy one-person removal of a camper top from a pickup truck by supporting, in combination with other like stands, the camper top in an elevated position relative to the truck bed after the top has been raised free of the truck bed by jacking whereby the truck may be driven out from under the elevated camper top. See FIG. 1.

Figure 1:
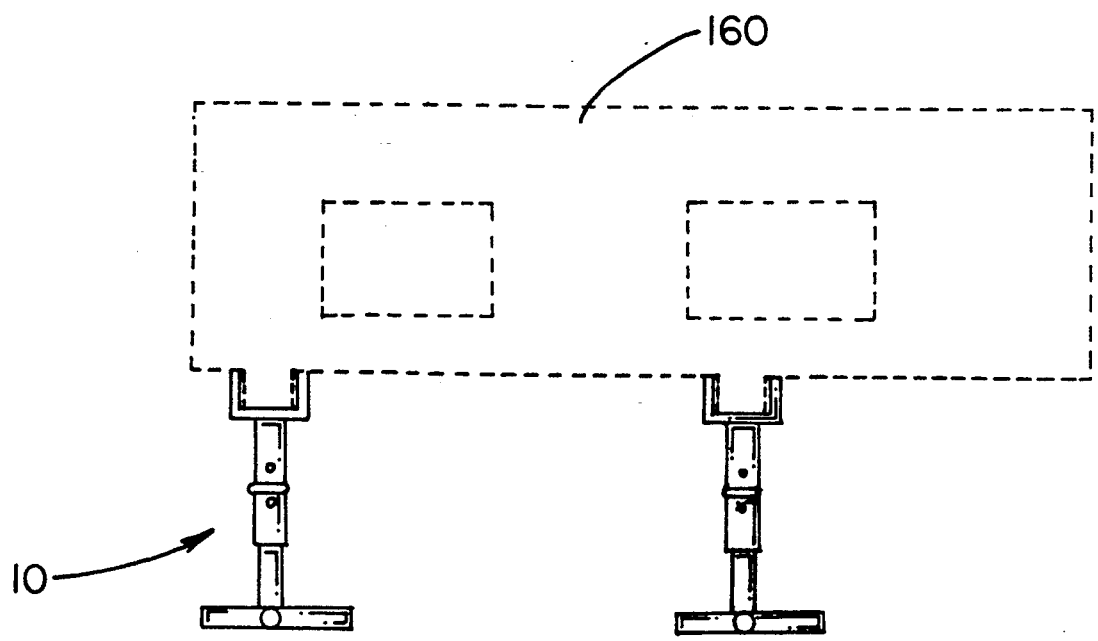
FIG. 1 is a side elevational view of the invention being used, in combination with another of the same invention, to support a typical truck camper.
Figure 2:
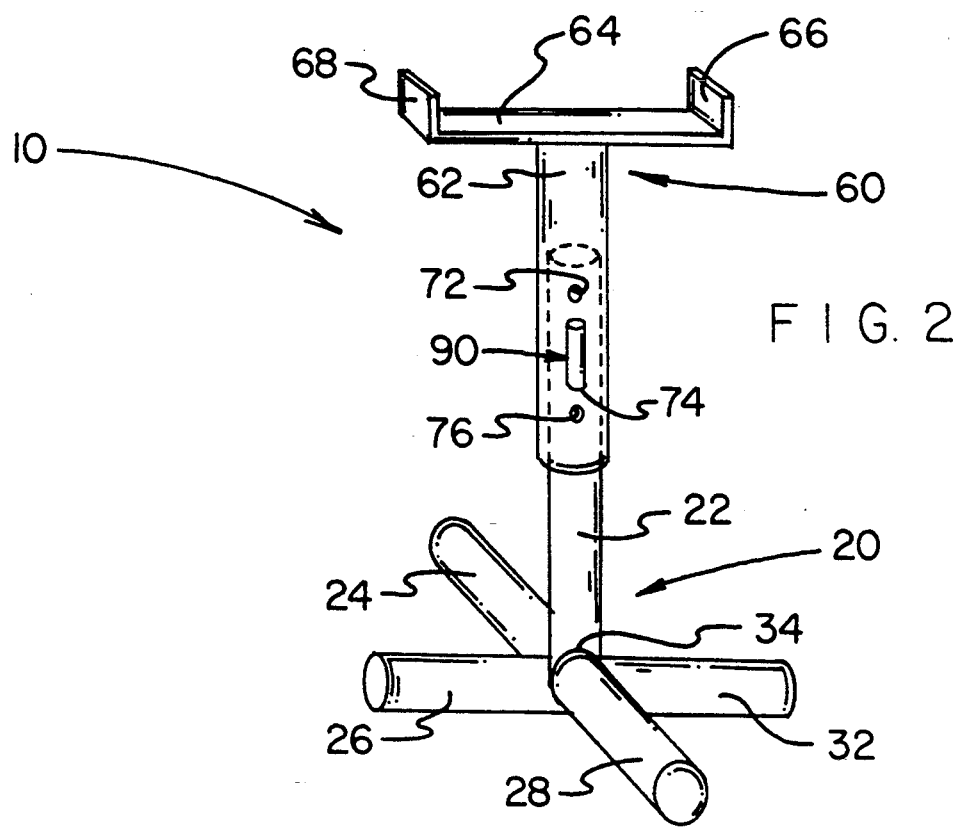
FIG. 2 is a perspective view of the invention.

With reference now to FIGS. 1, 2, and 3 and more specifically, it will be noted that the portable telescoping stand for truck camper tops 10 facilitates easy one-person removal of a camper top 160 from a pickup truck. Removal is facilitated by supporting, in combination with other like stands, the camper top 160 in an elevated position relative to the truck bed after the top has been raised free of the truck bed by jacking. The truck may then be driven out from under the elevated camper top.

The portable telescoping stand for truck camper tops 10 comprises a lower support structure 20 having a first hollow column 22 supported in an upright position by a base. The base has a plurality of spaced apart support legs 24, 26, 28, and 32 fixedly radially connected at one end to the lower end 34 of the first column, the support legs extending from the first column at right angles to the column.

The legs 24, 26, 28, and 32 are equally spaced around the column 22 to provide stability for the column whereby tipping caused by slightly off-center loads is precluded. The first column 22 also has a plurality of spaced apart lateral holes 36, 38, and 42 therethrough, the lateral holes lying on parallel axes to each other at right angles to and intersecting the axis of the hollow first column 22. The stand 10 also includes an upper support structure 60 having a hollow second column 62 telescopically operationally disposed over the first column 22 whereby the overall height of the stand 10 may be increased or decreased.

The second column 62 has a bifurcated yoke 64 with upstanding ears 66 and 68 fixedly connected to the upper end. The second column 62 also has a plurality of spaced apart lateral holes 72, 74, and 76 therethrough, the lateral holes having essentially the same diameter as the holes 36, 38, and 42 of the first column. The lateral holes 72, 74, and 76 lie on parallel axes to each other and at right angles to and intersecting the axis of the hollow second column 62 so when the upper support structure 60 is telescopically longitudinally moved with respect to the lower support structure 20 holes in the second column 62 may be made to line up with holes in the first column 22.

The stand 10 further includes pin means 90 whereby the overall height of the stand 10 may be locked at any one of a plurality of discrete steps by inserting the pin 90 through coincident holes of the first and second columns 22 and 62 nearest a desired stand height. The pin means 90 comprises a rod 92 formed from shear-resistant material such as steel.

The rod is substantially longer than the diameter of the second column 62. The rod 92 also has a diameter essentially the same as the diameter of the holes of the first and second columns. The rod 92 additionally has handle means 94 whereby the rod may be easily grasped by a user. The rod 92 extends through a hole 74 in the second column and also extends through a hole 38 in the first column.

Figure 4:
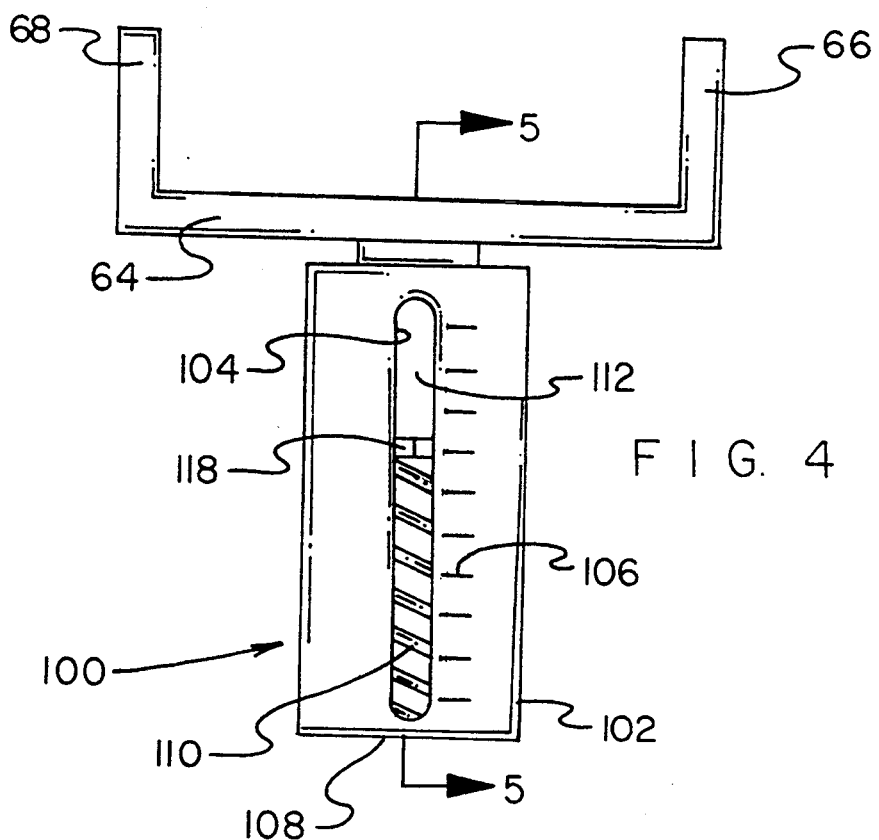
FIG. 4 is a side elevational detail of a first modification of the invention of FIG. 2 illustrating an added weight scale.
Figure 5:
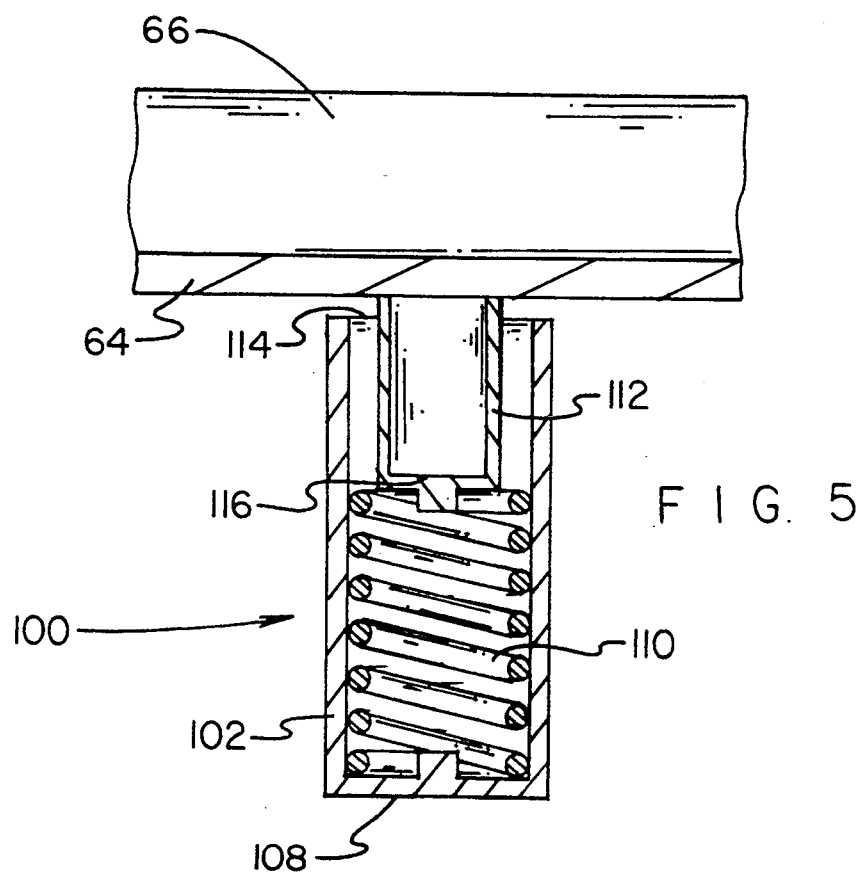
FIG. 5 is a partial sectional view of the invention of FIG. 4, showing the weight scale biasing means, taken along the line 5—5.

Referring also now to FIGS. 4 and 5, in a first modification of the preferred embodiment, the upper support structure 60 is modified to include a weight scale means 100 whereby the heaviness of the supported camper top 160 may be ascertained, the weight scale means 100 comprises a tubular body 102 fixedly collinearly connected to the upper end of the second column 62. The tubular body 102 has essentially the same outside diameter as the second column 62. The tubular body 102 also has a closed lower end 108 and an open upper end 114.

The tubular body 102 additionally has a longitudinal slot 104 therethrough and calibrated weight indicia 106 along a longitudinal edge of the longitudinal slot 104. The weight scale means 100 also includes a bifurcated yoke 64 with upstanding ears 66 and 68. The bifurcated yoke 64 is fixedly connected to a downwardly projecting cylindrical member 112 which has an outside diameter essentially the same as the inside diameter of the of the tubular body 102.

The cylindrical member 112 is operationally telescopically disposed within the tubular body 102. The weight scale means 100 additionally has a biasing means 110, such as a coil compression spring, having a predictable coefficient of compression. The biasing means 110 has an outside diameter essentially the same as the inside diameter of the tubular body 102. The biasing means 110 is also captively longitudinally disposed within the tubular body 102 such that it is trapped between the closed bottom end of the tubular body 108 and the bottom end 116 of the cylindrical member whereby biasing the cylindrical member 112 upwardly whereby a load weight placed on the yoke 64 will cause the cylindrical member 112 to overcome a portion of the biasing tension being deflected downwardly within the tubular body 102 by an amount proportional to the load.

The weight scale means 100 further includes indicating means 118 whereby the amount of downward deflection of the cylindrical member 112 may be interpreted by a user as units of weight. The indicating means 118 comprises a mark, such as an annular ring inscribed on the surface of the cylindrical member 112. The mark is located on the cylindrical member 112 such that it is visible through the slot 104 of the tubular body 102 whereby a user may visually compare the position of the indicating means 118 to the calibrated indicia 106 whereby a specific load weight may be ascertained.

Figure 6:
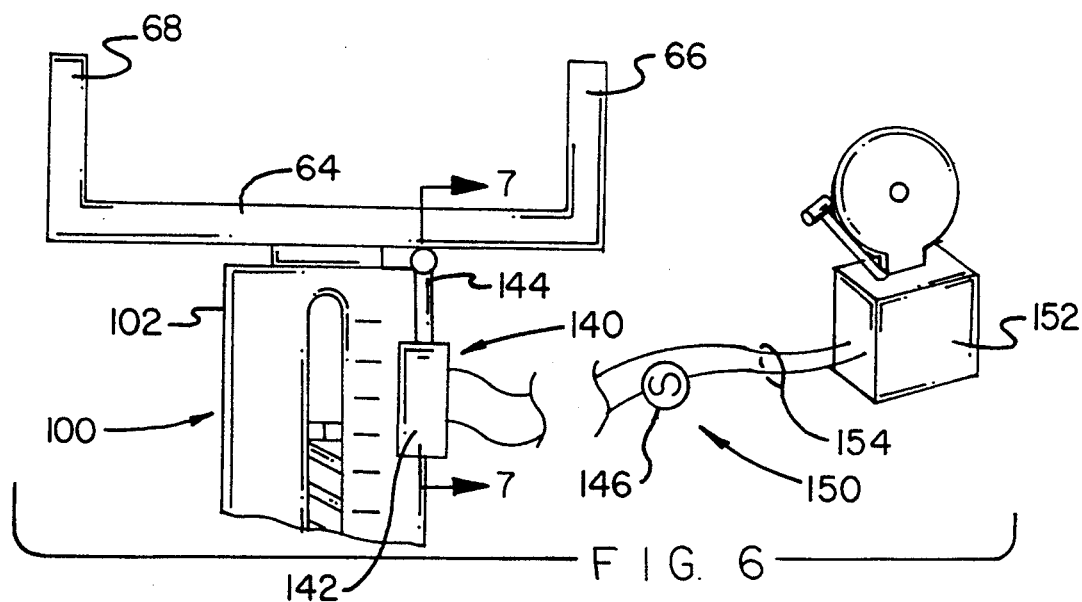
FIG. 6 is a side elevational view of a second modification of the invention of FIG. 4 depicting the added theft alarm.
Figure 7:
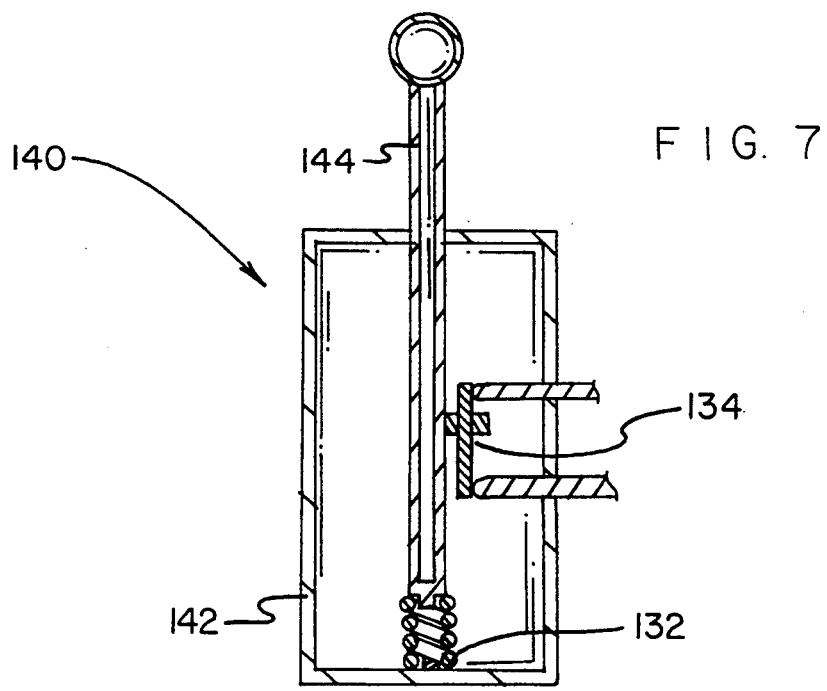
FIG. 7 is a sectional view of the invention of FIG. 6 taken along the line 7—7 and illustrating the theft alarm biased switch contacts and actuator.

The portable telescoping stand for truck camper tops 10, in a second modification of the preferred embodiment (shown in FIGS. 6 and 7), further includes a theft alarm 150 whereby an aural signal is sounded upon removal of the camper top 160 from the stand 10. The theft alarm 150 comprises electrical switch contact means 134 being biased normally closed. The switch contact means 134 also being fixedly connected to the tubular body 102 of the weight scale means.

The switch contact means 134 also having a linkage 144 fixedly operationally connected to the bifurcated yoke 64 of the weight scale means whereby the weight of the camper top on the yoke causes the switch contact means 134 to open. The theft alarm 150 additionally has electrical alarm means 152 such as a bell or buzzer, the alarm means 152 being operationally connected in series with the switch contact means 134. The theft alarm 150 further includes a source of electrical current 146 having characteristics appropriate for powering the electrical alarm means 152.

The source of electrical current 146 is operationally connected in series with the alarm means 152 and the switch contact means 134 whereby closing of the switch contacts caused by removing the weight of the camper top 160 causes electrical current to flow through the alarm means 152 whereby sounding an aural alarm.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. In as much as the present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

Now that the invention has been described,
What is claimed is:

1. A new and improved portable telescoping stand for truck camper tops for facilitating easy one-person removal of a camper top from a pickup truck by supporting, in combination with other like stands, the camper top in an elevated position relative to the truck bed after the top has been raised free of the truck bed by jacking whereby the truck may be driven out from under the elevated camper top, the portable telescoping stand for truck camper tops comprising:

a lower support structure having a first hollow column supported in an upright position by a base, the base having a plurality of spaced apart generally cylindrical shaped support legs fixedly radially connected at one end to the lower end of the first column, the support legs extending from the first column at right angles to the column, the legs being equally spaced around the column to provide stability for the column whereby tipping caused by slightly off-center loads is precluded, the first column also having a plurality of spaced apart lateral holes therethrough, the lateral holes lying on parallel axes to each other at right angles to and intersecting the axis of the hollow first column;

an upper support structure having a hollow second column telescopically operationally disposed over the first column whereby the overall height of the stand may be increased or decreased, the second column having a bifurcated yoke with upstanding ears fixedly connected to the upper end, the ears being positioned perpendicular to the yoke, the second column also having a plurality of spaced apart lateral holes therethrough, the lateral holes having essentially the same diameter as the holes of the first column, the lateral holes lying on parallel axes to each other at right angles to and intersecting the axis of the hollow second column so when the upper support structure is telescopically longitudinally moved with respect to the lower support structure holes in the second column may be made to line up with holes in the first column; and pin means whereby the overall height of the stand may be locked at any one of a plurality of discrete steps by inserting the pin through coincident holes of the first and second columns nearest a desired stand height, the pin means comprising:

a rod formed from shear-resistant material such as steel, the rod being formed in a linear generally cylindrical configuration and having a length substantially longer than the diameter of the second column, the rod also having a diameter essentially the same as the diameter of the holes of the first and second columns, the rod additionally having handle means whereby the rod may be easily grasped by a user, the rod extending through a hole in the second column, the rod also extending through a hole in the first column.

2. The portable telescoping stand for truck camper tops of claim 1 wherein the upper support structure is modified to include a weight scale means whereby the heaviness of the supported camper top may be ascertained, the weight scale means comprising:

a tubular body fixedly collinearly connected to the upper end of the second column, the tubular body having essentially the same outside diameter as the second column, the tubular body having a closed lower end and an open upper end, the tubular body having a longitudinal slot therethrough, the tubular body further having calibrated weight indicia along a longitudinal edge of the longitudinal slot;

a bifurcated yoke with upstanding ears, the bifurcated yoke being fixedly connected to a downwardly projecting cylindrical member, the cylindrical member having an outside diameter essentially the same as the inside diameter of the of the tubular body, the cylindrical member being operationally telescopically disposed within the tubular body;

a biasing means such as a coil compression spring having a predictable coefficient of compression, the biasing means having an outside diameter essentially the same as the inside diameter of the tubular body, the biasing means being captively longitudinally disposed within the cylindrical body such that it is trapped between the closed bottom end of the tubular body and the bottom end of the cylindrical member whereby biasing the cylindrical member upwardly whereby a load weight placed on the yoke will cause the cylindrical member to overcome a portion of the biasing tension being deflected downwardly within the tubular body by an amount proportional to the load; and indicating means whereby the amount of downward deflection of the cylindrical member may be interpreted by a user as units of weight, the indicating means comprising:

a mark such as an annular ring inscribed on the surface of the cylindrical member, the mark being located on the cylindrical member such that it is visible through the slot of the tubular body whereby a user may visually compare the position of the mark to the calibrated indicia whereby a specific load weight may be ascertained.

3. The portable telescoping stand for truck camper tops of claim 2 and further including a theft alarm whereby an aural signal is sounded upon removal of the camper top from the stand, the theft alarm comprising:

electrical switch contact means being biased normally closed, the switch contact means being fixedly connected to the tubular body of the weight scale means, the switch contact means also having a linkage fixedly operationally connected to the bifurcated yoke of the weight scale means whereby the weight of the camper top on the yoke causes the switch contact means to open;

electrical alarm means such as a bell or buzzer, the alarm means being operationally connected in series with the switch contact means; and a source of electrical current having characteristics appropriate for powering the electrical alarm means, the source of electrical current being operationally connected in series with the alarm means and the switch contact means whereby closing of the switch contacts caused by removing the weight of the camper top causes electrical current to flow through the alarm means whereby sounding an aural alarm.

* * * * *